Jan. 5, 1932.　　　N. MICHELMAN　　　1,840,048
PIPE JOINT
Filed March 7, 1928　　　2 Sheets-Sheet 1
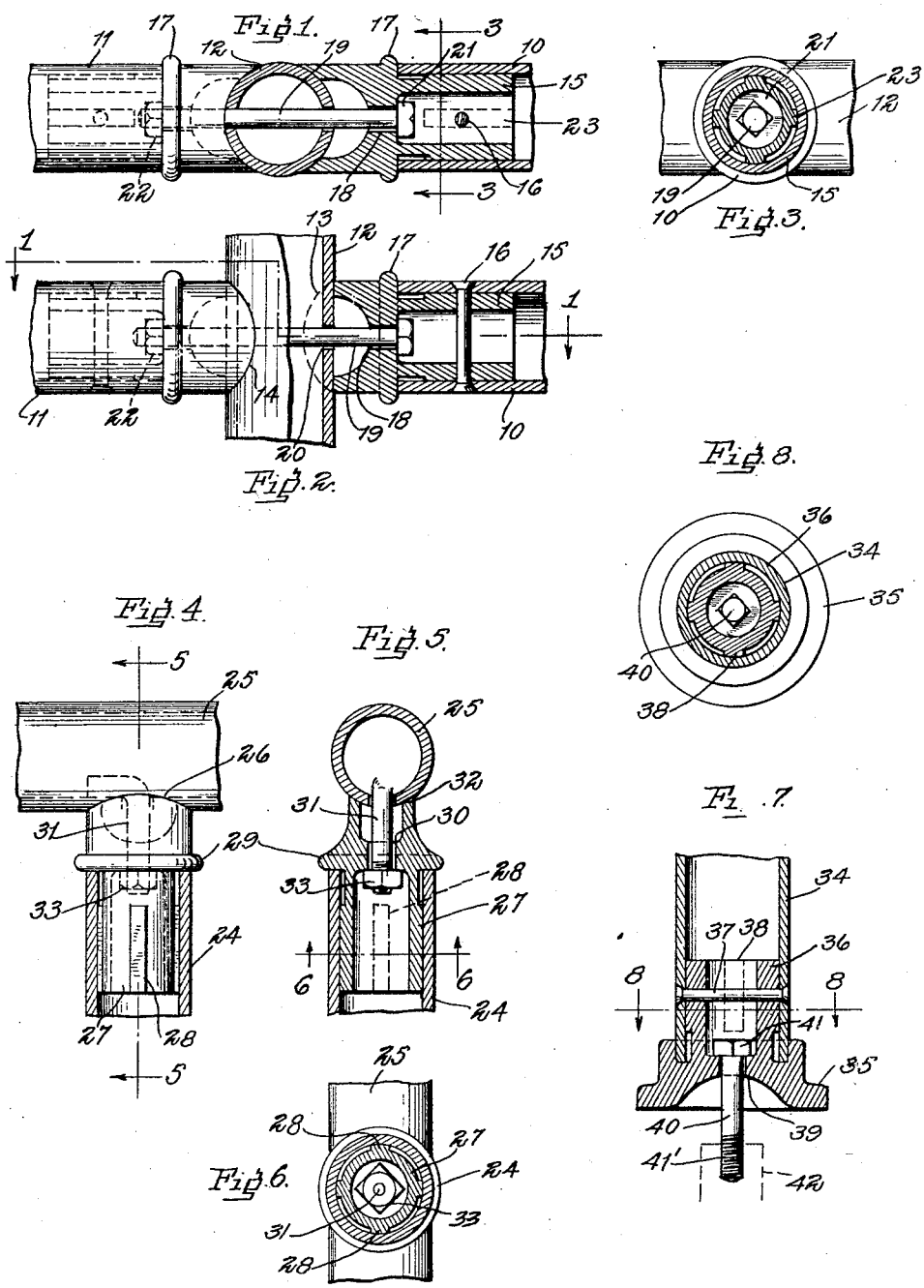

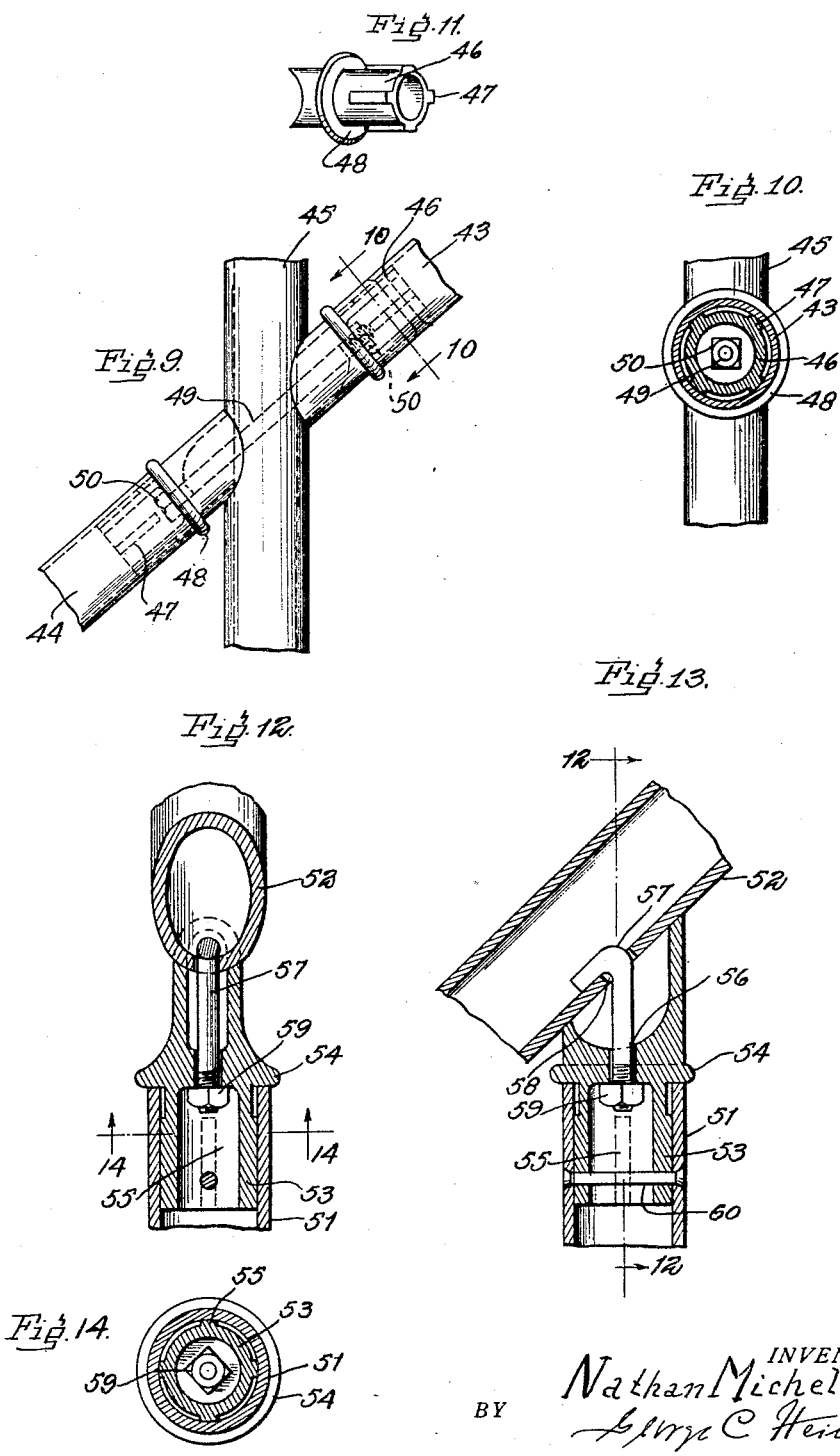

Patented Jan. 5, 1932

1,840,048

UNITED STATES PATENT OFFICE

NATHAN MICHELMAN, OF BROOKLYN, NEW YORK

PIPE JOINT

Application filed March 7, 1928. Serial No. 259,791.

This invention relates to improvements in pipe-joints, particularly intended for use in the construction of pipe railings or the like, and it is the principal object of my invention to provide a pipe joint of simple construction and one which is inexpensive, as it does away with the necessity to provide the customary screw threads at the ends of the pipes to be joined, which are expensive and moreover tend to weaken the pipe at the joint.

Another object of my invention is the provision of a foot for pipe rails allowing a simple inexpensive connection between foot and pipe rail.

A further object of my invention is the provision of simple and inexpensive, yet novel and improved means for joining the pipes forming a railing and angularly disposed to each other, as for instance bolt and nut or hook connections allowing a quick and ready connection and disconnection of the pipes.

These and other objects of my invention will become more fully known as the description thereof proceeds, and will then be specifically defined in the appended claim.

In the accompanying drawings, forming a material part of this disclosure:

Fig. 1 is a plan view of a pipe joint constructed according to my invention partly in section on line 1—1 of Figure 2.

Fig. 2 is a side elevation thereof.

Fig. 3 is a cross-section on line 3—3 of Fig. 1.

Fig. 4 is a side elevation of a modified pipe joint constructed according to my invention.

Fig. 5 is a longitudinal section on line 5—5 of Figure 4.

Fig. 6 is a cross-section on line 6—6 of Figure 5.

Fig. 7 is a sectional elevation of a pipe rail and foot flange.

Fig. 8 is a sectional plan view thereof, the section being taken on line 8—8 of Figure 7.

Fig. 9 is a side elevation of another modified form of pipe joint constructed according to my invention.

Fig. 10 is a section on line 10—10 of Figure 9.

Fig. 11 is a perspective fragmentary end view of a pipe end of Figure 9 to which another pipe is to be joined.

Fig. 12 is a sectional front elevation of a further modification of my pipe joint, the section being taken on line 12—12 of Figure 13.

Fig. 13 is a sectional side elevation of the pipe joint shown in Fig. 12.

Fig. 14 is a section on line 14—14 of Figure 12.

As illustrated in Figures 1 to 3 inclusive, the ends of two pipes 10 and 11 to be united to a cross-rail or pipe 12 in the construction of a pipe railing are obliquely cut on an arc 13, 14 to snugly engage the outer mantle of pipe 12 in the usual well known manner.

Each of the pipes 10 and 11 has formed therein near the joint a sleeve 15 held in place by means of a cross bolt 16, as shown in Figure 2 formed with a collar 17 perforated, as at 18, to allow the passage of a substantially centrally located bolt 19 extending from pipe 10 through perforations 20 in the pipe 12 and through the collar 17 of pipe 11.

Nuts 21 and 22 on the ends of the bolt 19 behind the collars 17 allow a firm connection of both pipes 10, 11 with the pipe 12, as will be evident by an inspection of the drawings.

Longitudinally extending ribs 23 of sleeves 15 slide in the pipes 10 and 11 to firmly guide the sleeve within the pipe.

In the form of my invention illustrated in Figures 4 to 6 inclusive, the pipe 24 is to be joined to a pipe 25 arranged substantially at a right angle thereto, and has an arcuate end 26 adapted to snugly fit against the outer mantle of pipe 25. A sleeve 27 is provided in pipe 24 and has longitudinally extending ribs 28 formed in its outer mantle which snugly fit in the inner pipe wall to guide the sleeve therein. This sleeve is equipped with a collar 29 provided with a central opening 30 through which passes a hook 31, which passes also through a perforation 32 in the bottom of pipe 25 so that its hook end engages the inner wall thereof, as indicated in Figure 4. The lower end of hook 31 is threaded and carries under collar 29 a nut 33, and it will be clear that the proper manipulation of the nut will establish a firm connection between pipes 24 and 25.

In Figures 7 and 8, I have shown a foot section of a pipe section to be used in the construction of fence railings or the like. The pipe 34 seats in a foot section 35, over a sleeve 36 within the pipe formed integrally with or otherwise connected to the foot section. Sleeve and pipe are connected by a cross bolt 37 and longitudinal ribs 38 on the sleeve guide the same firmly against rotation.

The foot 35 has a centrally located perforation 39 through which extends vertically a bolt 40, the upper end of which carries a nut 41, resting within the sleeve upon the foot part 35, while the lower end of bolt 40 is threaded, as at 41', and adapted to be embedded in a suitable base 42, wooden, concrete, metal or the like.

As shown in Figures 9, 10 and 11, the obliquely arranged pipes 43, 44, are to be joined to a substantially vertically disposed pipe 45.

Also in this form the pipes 43, 44 have an inner sleeve 46 therein having outer, longitudinally extending ribs 47 adapted to engage in the inner pipe walls, and a collar 48 having a median perforation allowing the passage of a bolt 49 which passes intermediate its ends through suitably arranged perforations in the wall of pipe 45, and carries at its ends in pipes 43 and 44 behind collars 48 nuts 50, so that by the proper manipulation of the same the pipes 43, 44 will be firmly joined to pipe 45, as will be apparent from Figure 9.

In Figures 12 and 13 a form of joining pipes for pipe railings similar to that shown in Figure 4 is illustrated, however we have here the pipe 51 joined to a pipe 52 not horizontally disposed but obliquely arranged to pipe 51.

Also in this form an inner sleeve 53 is present, having a flange 54 and ribs 55 on its outer mantle guided in the inner wall of pipe 51. The flange 54 is centrally perforated, as at 56 and allows the passage of a hook 57 entering through a perforation 58, pipe 52, and engaging with its hooked part the inner wall thereof as shown in Figure 13, while its lower threaded end carries below collar 54 a nut 59, so that by the proper manipulation thereof a firm connection between pipes 51 and 52 is established. The sleeve 53 is firmly held in pipe 51 by means of a cross bolt 60 or the like.

The operation of my invention will be entirely clear from the above description at the hand of the accompanying drawings.

It will be understood that I have disclosed the preferred forms of my pipe joint as examples only of the many ways to practically construct a pipe railing and that I may make such changes in the general arrangement and in the construction of the minor details thereof as come within the scope of the appended claim without departure from my invention and the principles involved.

Having thus described my invention, what I claim as new, and desire to secure by Letters Patent is:—

Tube connection for uniting the ends of two tubes to a perforated third tube engaged by said ends, comprising a sleeve formed in each of said pair of tubes near the joint, cross-bolts for holding both sleeves in place in said tubes, obliquely cut perforated collars on said sleeves, a substantially centrally located bolt extending through the perforations in said collars and the perforations in the third tube, nuts at the ends of said central bolt behind said collars, and longitudinally extending ribs on said sleeves for firmly guiding the same within the tubes.

Signed at Brooklyn, in the county of Kings and State of New York, this 3rd day of March, A. D. 1928.

NATHAN MICHELMAN.